US012745276B2

(12) United States Patent
Fujishiro

(10) Patent No.: US 12,745,276 B2
(45) Date of Patent: Sep. 22, 2026

(54) RELAY CONTROL METHOD AND COMMUNICATION NODE

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 414 days.

(21) Appl. No.: 17/885,315

(22) Filed: Aug. 10, 2022

(65) Prior Publication Data

US 2022/0386309 A1 Dec. 1, 2022

Related U.S. Application Data

(63) Continuation of application No. PCT/JP2021/004381, filed on Feb. 5, 2021.

(30) Foreign Application Priority Data

Feb. 12, 2020 (JP) ................................ 2020-021900

(51) Int. Cl.
*H04W 72/00* (2023.01)
*H04W 28/02* (2009.01)
(Continued)

(52) U.S. Cl.
CPC ....... *H04W 72/54* (2023.01); *H04W 28/0278* (2013.01); *H04W 36/0055* (2013.01); *H04W 84/047* (2013.01)

(58) Field of Classification Search
CPC ............. H04W 28/02; H04W 28/0278; H04W 36/0055; H04W 72/12; H04W 72/50; H04W 72/54; H04B 7/15528
See application file for complete search history.

(56) References Cited

U.S. PATENT DOCUMENTS

2016/0338095 A1* 11/2016 Faurie .................. H04W 72/20
2022/0094425 A1* 3/2022 Wei ...................... H04W 88/04
(Continued)

FOREIGN PATENT DOCUMENTS

EP 3570617 A1 11/2019
WO WO-2020027602 A1 * 2/2020 ........ H04W 28/0278
WO 2021/025145 A1 2/2021

OTHER PUBLICATIONS

Itri, "Trigger Conditions for low-latency IAB Uplink Scheduling," 3GPP TSG-RAN WG2 Meeting #108, R2-1915068, Nov. 18-22, 2019, pp. 1-4, Reno, U.S.A.
(Continued)

*Primary Examiner* — Shantell L Heiber
(74) *Attorney, Agent, or Firm* — Studebaker Brackett PLLC

(57) ABSTRACT

A relay control method according to the first aspect is a method used in a mobile communication system in which one or a plurality of relay nodes relay data from user equipment to a base station. The relay control method includes: predicting, by a first lower node, an estimate transmission data amount being an estimate amount of data to be transmitted within a certain period from the first lower node to a first upper node being an upper node of the first lower node; and transmitting, by the first lower node, data amount information indicating the estimate transmission data amount to the first upper node.

3 Claims, 13 Drawing Sheets

(51) Int. Cl.

| | |
|---|---|
| ***H04W 36/00*** | (2009.01) |
| ***H04W 72/54*** | (2023.01) |
| *H04W 84/04* | (2009.01) |

(56) References Cited

U.S. PATENT DOCUMENTS

2022/0132364 A1* 4/2022 Lee .................. H04W 28/0278
2022/0159771 A1 5/2022 Fujishiro

OTHER PUBLICATIONS

Intel Corporation, "Uplink latency reduction," 3GPP TSG RAN WG2 Meeting #108, R2-1914736, Nov. 18-22, 2019, pp. 1-3, Reno, U.S.A.
RAN-2, "Integrated Access and Backhaul for NR", 3GPP TSG RAN, Meeting #86, RP-193185, Dec. 9-12, 2019, Sitges, Spain.
Kyocera; "Consideration of preemptive BSR in IAB;" 3GPP TSG-RAN WG2 #108; R2-1915596; Nov. 18-22, 2019; p. 1-5; Reno, USA.
LG Electronics Inc., LG UPlus; "BSR MAC CE format for pre-BSR;" 3GPP TSG-RAN WG2 Meeting #107; R2-1911339, Aug. 26-30, 2019; p. 1-3; Prague, Czech Republic.
LG Electronics Inc.; "E2E reliability in hop-by-hop RLC ARQ;" 3GPP TSG-RAN WG2 #105bis; R2-1904942, Apr. 8-12, 2019; p. 1-4; Xi'an, China.

* cited by examiner

RELAY CONTROL METHOD AND COMMUNICATION NODE

RELATED APPLICATIONS

The present application is a continuation based on PCT Application No. PCT/JP2021/004381, filed on Feb. 5, 2021, which claims the benefit of Japanese Patent Application No. 2020-021900 filed on Feb. 12, 2020. The content of which is incorporated by reference herein in their entirety.

TECHNICAL FIELD

The present disclosure relates to a relay control method and a communication node used in a mobile communication system.

BACKGROUND ART

In the 3rd Generation Partnership Project (3GPP), which is a standardization project of a mobile communication system, a new relay node referred to as an Integrated Access and Backhaul (IAB) node has been under study. One or a plurality of relay nodes are involved in communication between a base station and user equipment, and perform relay for the communication.

In 3GPP, a sidelink relay technique in which the user equipment is used as a relay node has been under study. The sidelink relay is a technique in which a relay node referred to as a relay user equipment (relay UE) is involved in communication between a base station and a remote user equipment (remote UE), and performs relay for the communication.

SUMMARY

A relay control method according to the first aspect is a method used in a mobile communication system in which one or a plurality of relay nodes relay data from a user equipment to a base station. The relay control method includes: predicting, by a first lower node, an estimate transmission data amount being an estimate amount of data to be transmitted within a certain period from the first lower node to a first upper node being an upper node of the first lower node; and transmitting, by the first lower node, data amount information indicating the estimate transmission data amount to the first upper node. The first lower node is a relay node included in the one or the plurality of relay nodes, or the user equipment. The first upper node is a relay node included in the one or the plurality of relay nodes, or the base station.

A communication node according to a second aspect is an apparatus for operating as a first lower node in a mobile communication system in which one or a plurality of relay nodes relay data from a user equipment to a base station. The communication node includes: a controller configured to predict an estimate transmission data amount being an estimate amount of data to be transmitted within a certain period in future from the first lower node to a first upper node being an upper node of the first lower node; and a transmitter configured to transmit data amount information indicating the estimate transmission data amount to the first upper node. The first lower node is a relay node included in the one or the plurality of relay nodes, or the user equipment. The first upper node is a relay node included in the one or the plurality of relay nodes, or the base station.

A relay control method according to a third aspect is a method used in a mobile communication system in which one or a plurality of relay nodes relay data from a user equipment to a first base station. The relay control method includes: receiving, by a first relay node included in the one or the plurality of relay nodes, data from a lower node being a lower node of the first relay node; storing, by the first relay node, the data received from the lower node until transmission of the received data to an upper node being an upper node of the first relay node completes; executing, by the first relay node, handover to a second base station different from the first base station or to a second relay node under control of the second base station; and discarding, by the first relay node, the stored data, in response to execution of the handover.

A communication node according to a fourth aspect is an apparatus for operating as a first relay node included in one or a plurality of relay nodes in a mobile communication system in which the one or the plurality of relay nodes relay data from a user equipment to a first base station. The communication node includes: a receiver configured to receive data from a lower node being a lower node of the first relay node; and a controller configured to store the data received from the lower node until transmission of the received data to an upper node being an upper node of the first relay node completes. The controller is configured to discard the stored data, in response to execution of handover by the first relay node to a second base station different from the first base station or to a second relay node under control of the second base station.

DESCRIPTION OF EMBODIMENTS

When one or a plurality of relay nodes relay communication between a user equipment and a base station, implementation of a relay control method for appropriately controlling relay of data from the user equipment to the base station is desirable.

In view of this, the present disclosure has an object to appropriately control uplink data relay.

A mobile communication system according to embodiments will be described with reference to the drawings. In the description of the drawings, the same or similar parts are denoted by the same or similar reference signs.

First Embodiment

First Configuration Example of Mobile Communication System

Figure 1:
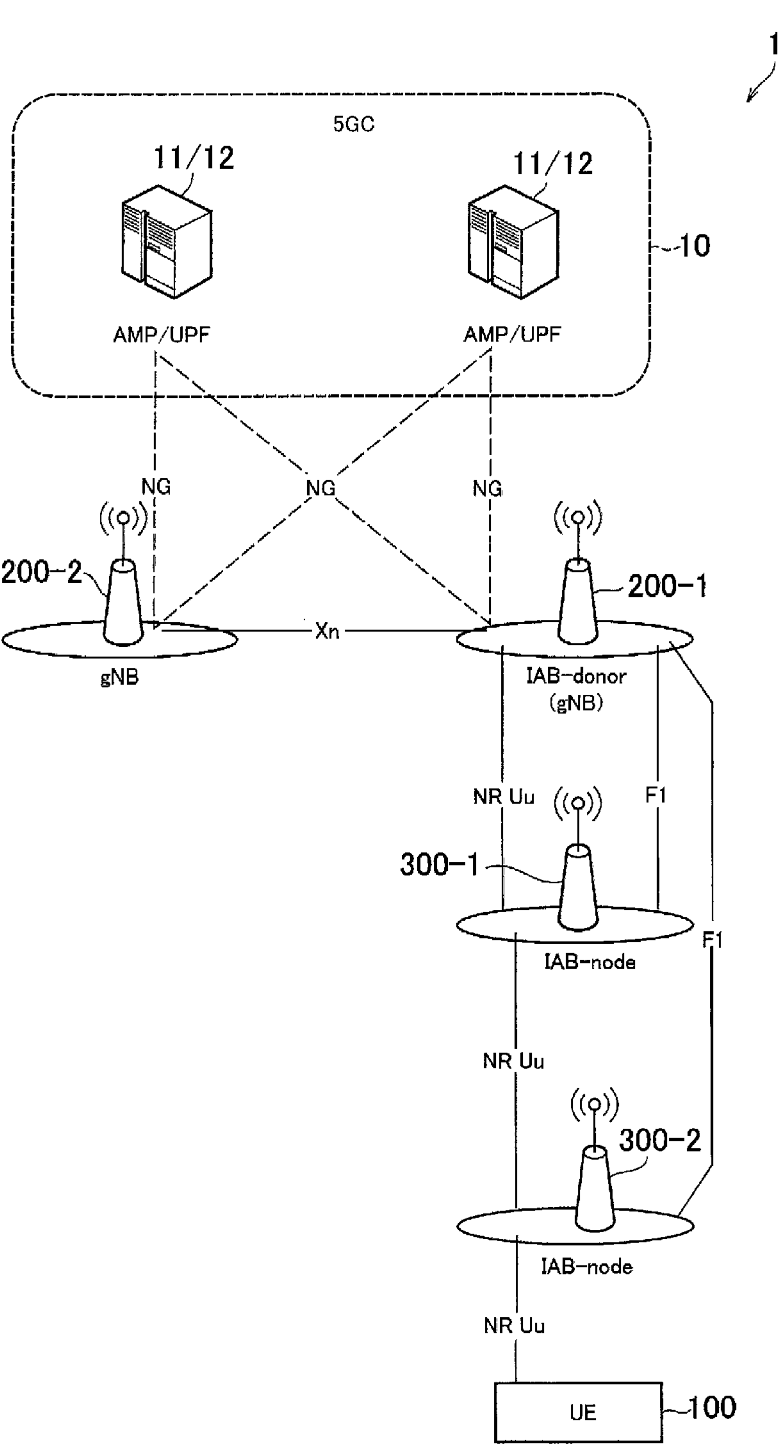
FIG. 1 is a diagram illustrating a first configuration example of a mobile communication system according to a first embodiment.

First, a first configuration example of a mobile communication system according to a first embodiment will be described. FIG. 1 is a diagram illustrating a first configuration example of a mobile communication system 1 according to the first embodiment.

The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is a first example of a relay node. The first embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication apparatus that manages one or a plurality of cells. The cell is used as a term denoting a minimum unit of a wireless communication area. The cell may be used as a term denoting a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol refers to a communication protocol between the CU and the DU. The F1 protocol includes an F1-C protocol corresponding to a protocol for a control plane, and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

Each IAB node 300 includes a mobile termination (MT) corresponding to a user equipment function unit and a DU corresponding to a base station function unit.

The MT is connected to the DU of an upper node (upper IAB node or a donor gNB 200-1). The MT is connected to the CU of the donor gNB 200-1 by using RRC, and establishes, with the donor gNB 200-1, a signaling radio bearer (SRB) that carries an RRC message and an NAS message. An adjacent node on an NR Uu wireless interface of the MT (i.e., an upper node) may be referred to as a "master node." A radio link between the MT of the IAB node 300 and the upper node is referred to as a backhaul link.

The DU manages cells similarly to the gNB 200. The DU terminates the NR Uu wireless interface to the UE 100 and a lower IAB node. The DU supports the F1 protocol for the CU of the donor gNB 200-1. An adjacent node on an NR access interface of the DU (i.e., lower node) may be referred to as a "slave node".

All IAB nodes 300 connected to the donor gNB 200-1 via one or a plurality of hops form a Directed Acyclic Graph (DAG) topology rooted in the donor gNB 200-1. The DAG topology may be referred to as an IAB topology. In the DAG topology, the direction of the master node may be referred to as "upstream" or "upper", and the direction of the slave node may be referred to as "downstream" or "lower".

An example is illustrated in FIG. 1 in which the IAB node 300-1 is wirelessly connected to the donor gNB 200-1, the IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to an upper node (IAB node 300 or gNB 200) via an access link.

FIG. 1 illustrates an example in which the UE 100 is wirelessly connected to the IAB node 300-2. The UE 100 indirectly communicates with the donor gNB 200-1 via the IAB node 300-2 and the IAB node 300-1. Specifically, the IAB node 300-2 and the IAB node 300-1 relay uplink data from the UE 100 to the donor gNB 200-1 and relay downlink data from the gNB 200-1 to the UE 100.

Figure 2:
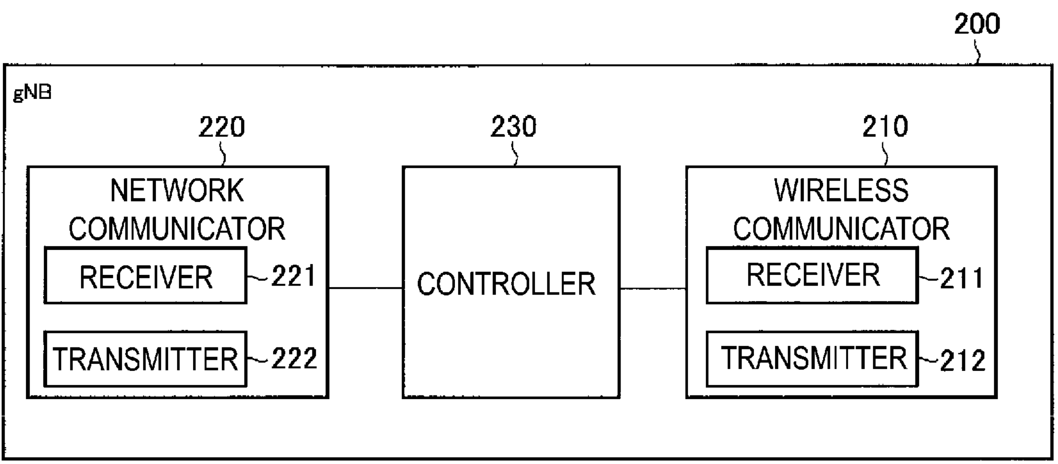
FIG. 2 is a diagram illustrating a configuration of a gNB.

Now, a configuration of the gNB 200, corresponding to a base station according to the first embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various kinds of receptions under control of the controller 230. The receiver 211 includes an antenna, and converts a radio signal received by the antenna into a baseband signal (received signal) and outputs the baseband signal to the controller 230. The transmitter 212 performs various kinds of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various kinds of receptions under control of the controller 230. The receiver 221 receives a signal from the outside and outputs the received signal to the controller 230. The transmitter 222 performs various kinds of transmissions under control of the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor executes processing of the layers described below.

Figure 3:
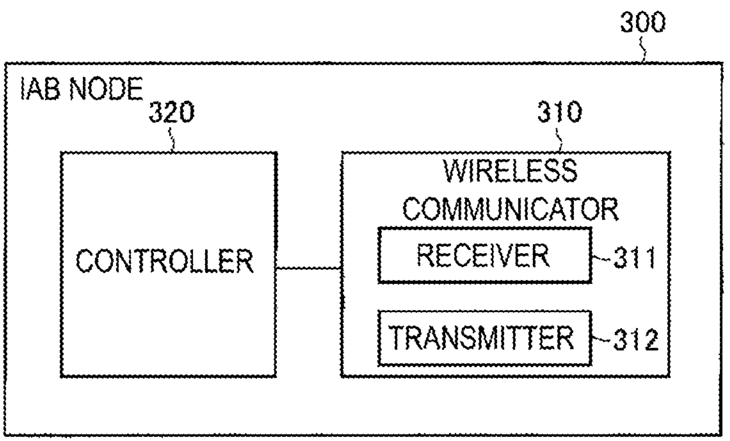
FIG. 3 is a diagram illustrating a configuration of an IAB node.

Next, a configuration of the IAB node 300 being a first example of the relay node according to the first embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (backhaul link) with the gNB 200 and performs wireless communication (access link) with the UE 100. The wireless communicator 310 for the backhaul link communication and the wireless communicator 310 for the access link communication may be provided separately.

The wireless communicator 310 includes a receiver 311 and a transmitter 312. The receiver 311 performs various kinds of receptions under control of the controller 320. The receiver 311 includes an antenna, and converts a radio signal received by the antenna into a baseband signal (received signal) and outputs the baseband signal to the controller 320. The transmitter 312 performs various kinds of transmissions under control of the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Figure 4:
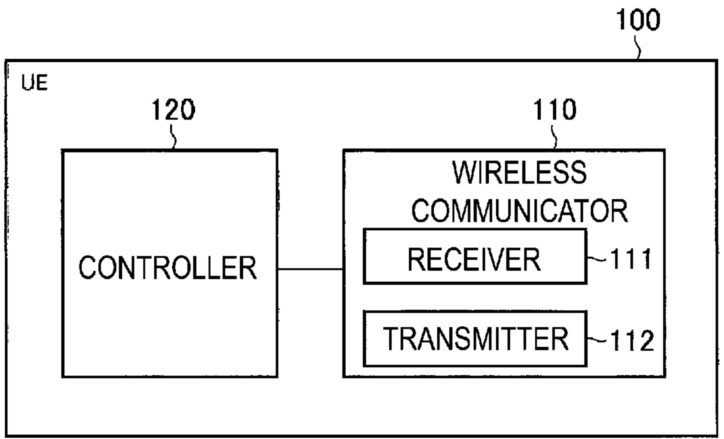
FIG. 4 is a diagram illustrating a configuration of a UE.

Now, a configuration of the UE 100, corresponding to a user equipment according to the first embodiment, will be described. FIG. 4 is a diagram illustrating a configuration of the UE 100. As illustrated in FIG. 4, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, in other words, wireless communication with another UE 100. The wireless communicator 110 includes a receiver 111 and a transmitter 112. The receiver 111 performs various kinds of receptions under control of the controller 120. The receiver 111 includes an antenna, and converts a radio signal received by the antenna into a baseband signal (received signal) and outputs the baseband signal to the controller 120. The transmitter 112 performs various kinds of transmissions under control of the controller 120. The transmitter 112 includes an antenna, and converts a baseband signal (transmission signal) to be output by the controller 120 into a radio signal and transmits the radio signal from the antenna.

The controller 120 performs various kinds of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Figure 5:
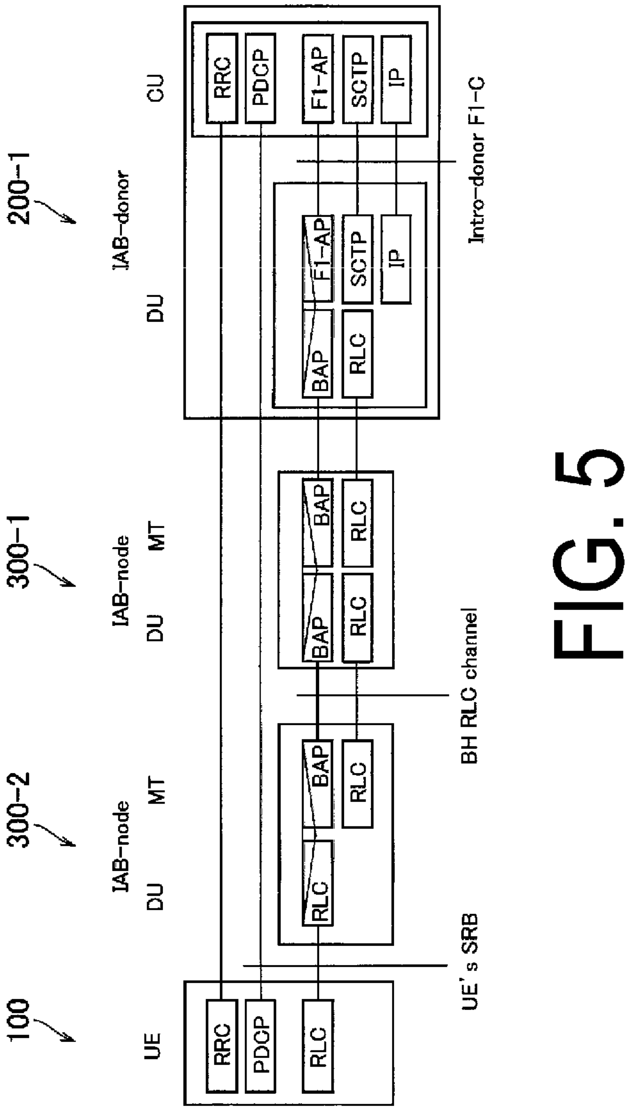
FIG. 5 is a diagram illustrating a protocol stack example in the first configuration example of the mobile communication system according to the first embodiment.
Figure 6:
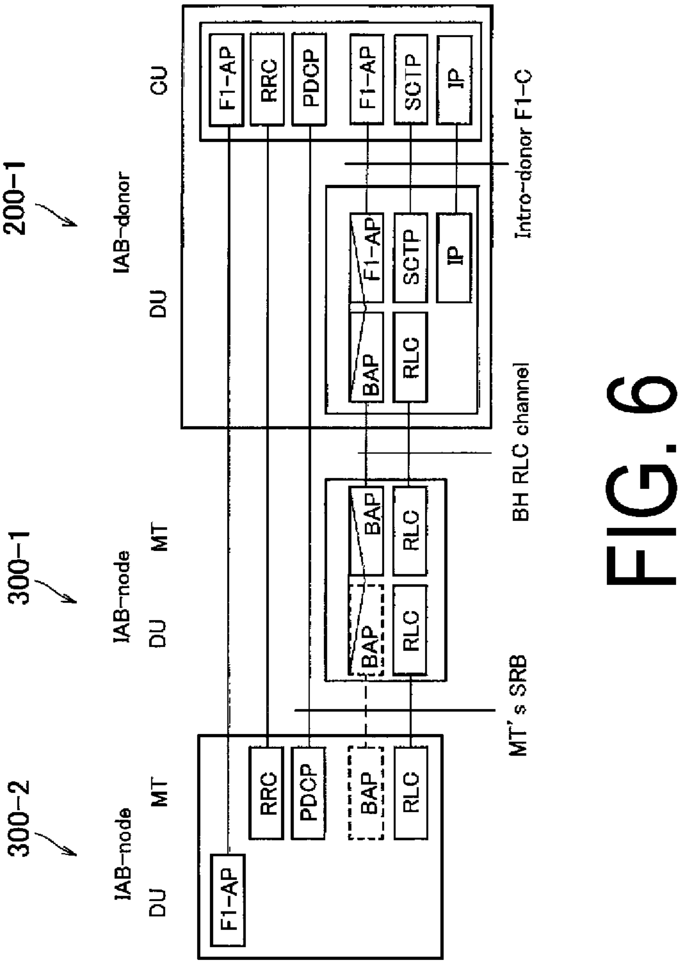
FIG. 6 is a diagram illustrating a protocol stack example in the first configuration example of the mobile communication system according to the first embodiment.

Next, a protocol stack example in the first configuration example of the mobile communication system 1 according to the first embodiment will be described. FIGS. 5 and 6 are each a diagram illustrating a protocol stack example in the first configuration example of the mobile communication system 1 according to the first embodiment.

In FIGS. 5 and 6, illustration of a medium access control (MAC) layer and a physical layer (PHY) layer being lower layers of a radio link control (RLC) layer are omitted. Note that the PHY layer is a layer that performs coding and decoding, modulation and demodulation, antenna mapping and demapping, and resource mapping and demapping. Between the PHY layers, data and control information are transmitted via a physical channel. The MAC layer performs retransmission processing and the like through preferential control of data and a hybrid ARQ (HARQ). Between the MAC layers, data and control information are transmitted via a transport channel. The MAC layer of the DU includes a scheduler. By performing scheduling processing, the scheduler determines transport formats (transport block sizes, modulation and coding schemes (MCSs)) in the uplink and the downlink and resource blocks (allocation radio resources) to be allocated to the UE 100.

As illustrated in FIG. 5, the donor gNB 200-1 is divided into the CU and the DU, and includes an F1-C interface (Intra-donor F1-C) between the CU and the DU. A packet data convergence protocol (PDCP) layer of the CU and a PDCP layer of the UE 100 communicate with each other via the IAB nodes 300-1 and 300-2. The PDCP layer is a layer that performs header compression and decompression, and encryption and decryption. A radio resource control (RRC) layer of the CU and an RRC layer of the UE 100 communicate with each other via the IAB nodes 300-1 and 300-2. The RRC layer transmits RRC signaling for various configurations. The RRC layer controls a logical channel, a transport channel, and a physical channel according to establishment, reestablishment, and release of a radio bearer.

When there is RRC connection between the RRC layers, the UE 100 is in an RRC connected state. When there is no RRC connection between the RRC layers, the UE 100 is in an RRC idle state.

In the DU and the MT, a backhaul adaptation protocol (BAP) layer is provided as an upper layer of the RLC layer. The BAP layer is a layer that performs routing processing and bearer mapping and demapping processing. Note that the UE 100 and the DU of the IAB node 300-2 do not include a BAP layer.

As illustrated in FIG. 6, an F1 application protocol (F1-AP) layer of the CU and an F1-AP layer of the DU of the IAB node 300-2 communicate with each other via the IAB node 300-1. The RRC layer of the CU and the RRC layer of the MT of the IAB node 300-2 communicate with each other via the IAB node 300-1. The PDCP layer of the CU and the PDCP layer of the MT of the IAB node 300-2 communicate with each other via the IAB node 300-1.

Note that, although illustration is omitted in FIG. 6, the F1-AP layer of the CU and the F1-AP layer of the DU of the IAB node 300-1 communicate with each other. The RRC layer of the CU and the RRC layer of the MT of the IAB node 300-1 communicate with each other. The PDCP layer of the CU and the PDCP layer of the MT of the IAB node 300-1 communicate with each other.

In the first configuration example as described above, the UE 100 transmits data to the DU of the IAB node 300-2 by using uplink radio resources allocated from the DU of the IAB node 300-2. The MT of the IAB node 300-2 transmits data from the UE 100 to the DU of the IAB node 300-1 by using uplink radio resources allocated from the DU of the IAB node 300-1. The MT of the IAB node 300-1 transmits data from the IAB node 300-2 to the DU of the donor gNB 200-1 by using uplink radio resources allocated from the DU of the donor gNB 200-1. Note that the uplink radio resources may be time and frequency resources, in particular, physical uplink shared channel (PUSCH) resources.

Thus, it is important that each upper node (specifically, each DU) allocates an appropriate amount of uplink radio resources to the lower node at appropriate timing. For example, when the timing of allocation of uplink radio resources is too late or the amount of allocation of uplink radio resources is too small, there is a delay in data relay from the UE 100 to the donor gNB 200-1, which causes deterioration of communication quality. On the other hand, when the timing of allocation of uplink radio resources is too early or the amount of allocation of uplink radio resources is too large, there is a waste in uplink radio resources to be allocated, which causes deterioration of resource use efficiency.

In the first embodiment, each lower node notifies the upper node of an estimate transmission data amount being an estimate amount of data to be transmitted within a certain period in future. With this, each upper node can recognize the data amount to occur in near future in the lower node, and can allocate an appropriate amount of uplink radio resources to the lower node at appropriate timing.

Second Configuration Example of Mobile Communication System

Figure 7:
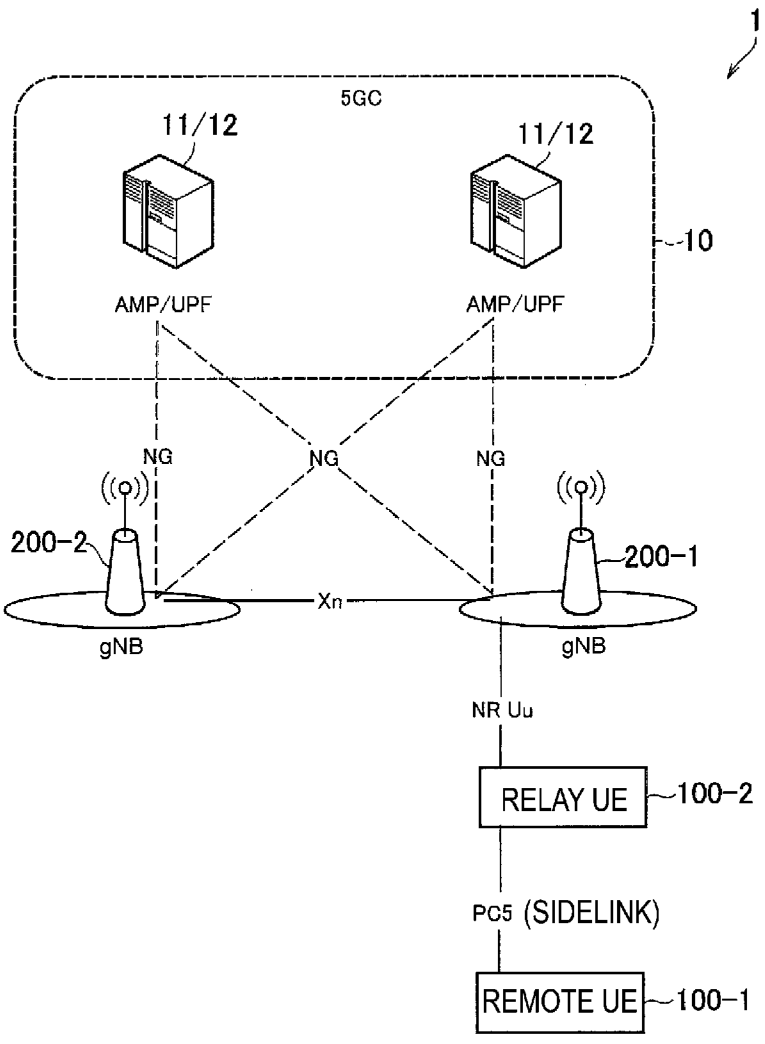
FIG. 7 is a diagram illustrating a second configuration example of the mobile communication system according to the first embodiment.

Next, a second configuration example of the mobile communication system according to the first embodiment will be described, regarding differences from the first configuration example described above. FIG. 7 is a diagram illustrating a second configuration example of the mobile communication system 1 according to the first embodiment.

As illustrated in FIG. 7, the mobile communication system 1 in configuration example 2 includes a 5GC 10, gNBs 200-1 and 200-2, a remote UE 100-1, and a relay UE 100-2. The relay UE 100-2 is a second example of the relay node according to the first embodiment. The remote UE 100-1 communicates with the relay UE 100-2 via a PC5 interface (sidelink) being an inter-UE interface. The relay UE 100-2 communicates with the gNB 200-1 via an NR Uu radio interface. As a result, the remote UE 100-1 indirectly communicates with the gNB 200-1 via the relay UE 100-2.

Figure 8:
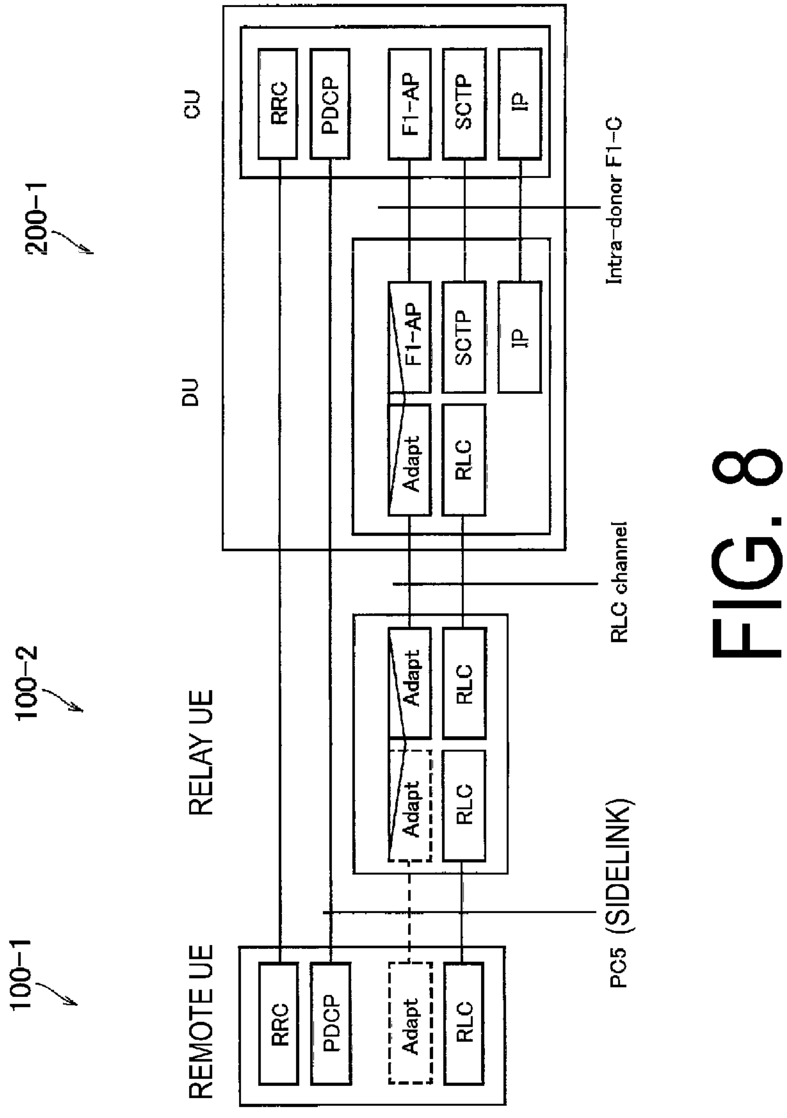
FIG. 8 is a diagram illustrating a protocol stack example of the second configuration example of the mobile communication system according to the first embodiment.

Next, a protocol stack example in the second configuration example of the mobile communication system 1 according to the first embodiment will be described. FIG. 8 is a diagram illustrating a protocol stack example of the second configuration example of the mobile communication system according to the first embodiment. In FIG. 8, illustration of the MAC layer and the PHY layer being lower layers of the RLC layer is omitted.

As illustrated in FIG. 8, the PDCP layer of the CU and the PDCP layer of the remote UE 100-1 communicate with each other via the relay UE 100-2. The RRC layer of the CU and the RRC layer of the remote UE 100-1 communicate with each other via the relay UE 100-2. In the DU, the relay UE 100-2, and the remote UE 100-1, an adaptation (Adapt) layer may be provided as an upper layer of the RLC layer.

Note that, although illustration is omitted in FIG. 8, the RRC layer of the CU and the RRC layer of the relay UE 100-2 communicate with each other. The PDCP layer of the CU and the PDCP layer of the relay UE 100-2 communicate with each other.

In the second configuration example as described above, the remote UE 100-1 transmits data to the relay UE 100-2 by using sidelink radio resources. The relay UE 100-2 transmits data from the remote UE 100-1 to the gNB 200-1 by using uplink radio resources allocated from the gNB 200-1.

Thus, it is important that the gNB 200-1 allocate an appropriate amount of uplink radio resources to the relay UE 100-2 at appropriate timing. For example, when the timing of allocation of uplink radio resources is too late or the amount of allocation of uplink radio resources is too small, there is a delay in data relay from the remote UE 100-1 to the gNB 200-1, which causes deterioration of communication quality. On the other hand, when the timing of allocation of uplink radio resources is too early or the amount of allocation of uplink radio resources is too large, there is a waste in uplink radio resources to be allocated, which causes deterioration of resource use efficiency.

In the first embodiment, at least one of the remote UE 100-1 and the relay UE 100-2 notifies the upper node of an estimate transmission data amount being an estimate amount of data to be transmitted within a certain period in future. With this, the upper node can recognize the data amount to occur in near future in the lower node, and can allocate an appropriate amount of radio resources to the lower node at appropriate timing.

Relay Control Method

Figure 9:
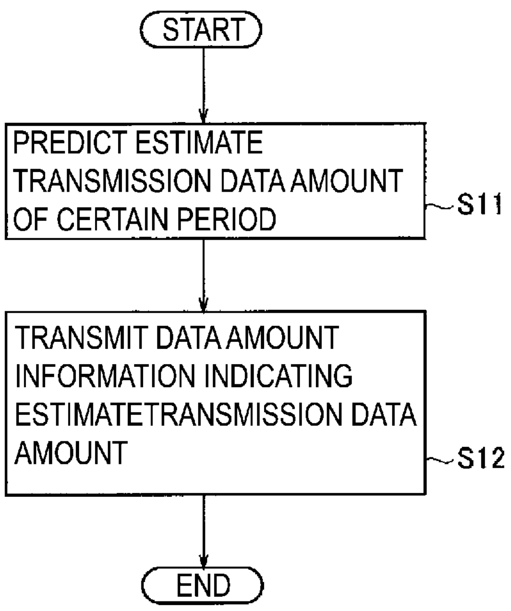
FIG. 9 is a diagram illustrating a relay control method according to the first embodiment.

Next, a relay control method in the mobile communication system 1 according to the first embodiment will be described. The relay control method according to the first embodiment is a method used in the mobile communication system 1 in which one or a plurality of relay nodes relay data from the UE 100 to the gNB 200-1. The relay node is at least one of the IAB node 300 in the first configuration example and the relay UE 100-2 in the second configuration example. FIG. 9 is a diagram illustrating a relay control method according to the first embodiment.

As illustrated in FIG. 9, in Step S11, the first lower node predicts an estimate transmission data amount being an estimate amount of data to be transmitted within a certain period in future to the first upper node being an upper node of the first lower node. The estimate transmission data amount may be an estimate amount of data that is allowed to be transmitted within a certain period in future.

Here, the first lower node is the relay node or the UE 100. The UE 100 may be the remote UE 100-1 in the second configuration example. In contrast, the first upper node is the relay node or the gNB 200. The gNB 200 may be the donor gNB 200-1.

Here, a method of predicting the data amount will be described. When the first lower node is the UE 100, the UE 100 may predict the estimate transmission data amount, based on at least one of application information obtained from the application layer and statistical information obtained from the most recent communication state. In contrast, when the first lower node is the relay node, the relay node may predict the estimate transmission data amount, based on at least one of a buffer state report (BSR) received from the second lower node being a lower node of the relay node and the radio resource amount allocated to the second lower node, in addition to the application information and the statistical information or instead of these pieces of information. Note that the BSR is a MAC layer message (MAC control element) including information indicating the data amount in a buffer of the second lower node.

In Step S12, the first lower node transmits data amount information indicating the estimate transmission data amount predicted in Step S11 to the first upper node. The first lower node may transmit the MAC control element including the data amount information to the first upper node, or may transmit an RRC layer message (RRC message) including the data amount information to the first upper node. With this, the first upper node can recognize the estimate amount of data to be transmitted from the first lower node within a certain period in future, based on the data amount information.

In the first embodiment, the first upper node may transmit configuration information for configuring the certain period to the first lower node. With this, the certain period can be specified and changed for the first lower node.

In the first embodiment, the first lower node may transmit time information indicating the certain period to the first upper node. With this, the first upper node can recognize the certain period corresponding to the estimate transmission data amount.

In the first embodiment, the first upper node may allocate uplink radio resources to the first lower node, based on the data amount information received from the first lower node. With this, uplink radio resources can be appropriately allocated to the first lower node.

In the first embodiment, the first upper node may be the relay node. The first upper node may request the second upper node being a further upper node of the first upper node to allocate uplink radio resources, based on the data amount information received from the first lower node. With this, the first upper node can request the second upper node to allocate an appropriate amount of uplink radio resources at appropriate timing, based on the data amount information.

In the first embodiment, the first lower node may be the relay node. The first lower node may transmit the data amount information to the first upper node, in response to occurrence of a first event or a second event. The first event may be an event in which the first lower node has received the BSR from the second lower node being a further lower node of the first lower node. The second event may be an event in which the first lower node has allocated uplink radio resources to the second lower node.

In the first embodiment, the first lower node may be the remote UE 100-1, and the first upper node may be the relay UE 100-2. The first lower node (remote UE 100-1) may transmit the data amount information to the first upper node (relay UE 100-2) on the sidelink.

In the first embodiment, the data amount information may be information indicating the estimate data amount in one or a plurality of transmission occasions until the certain period in future elapses. The transmission occasion may be a resource pool to be described later.

Figure 10:
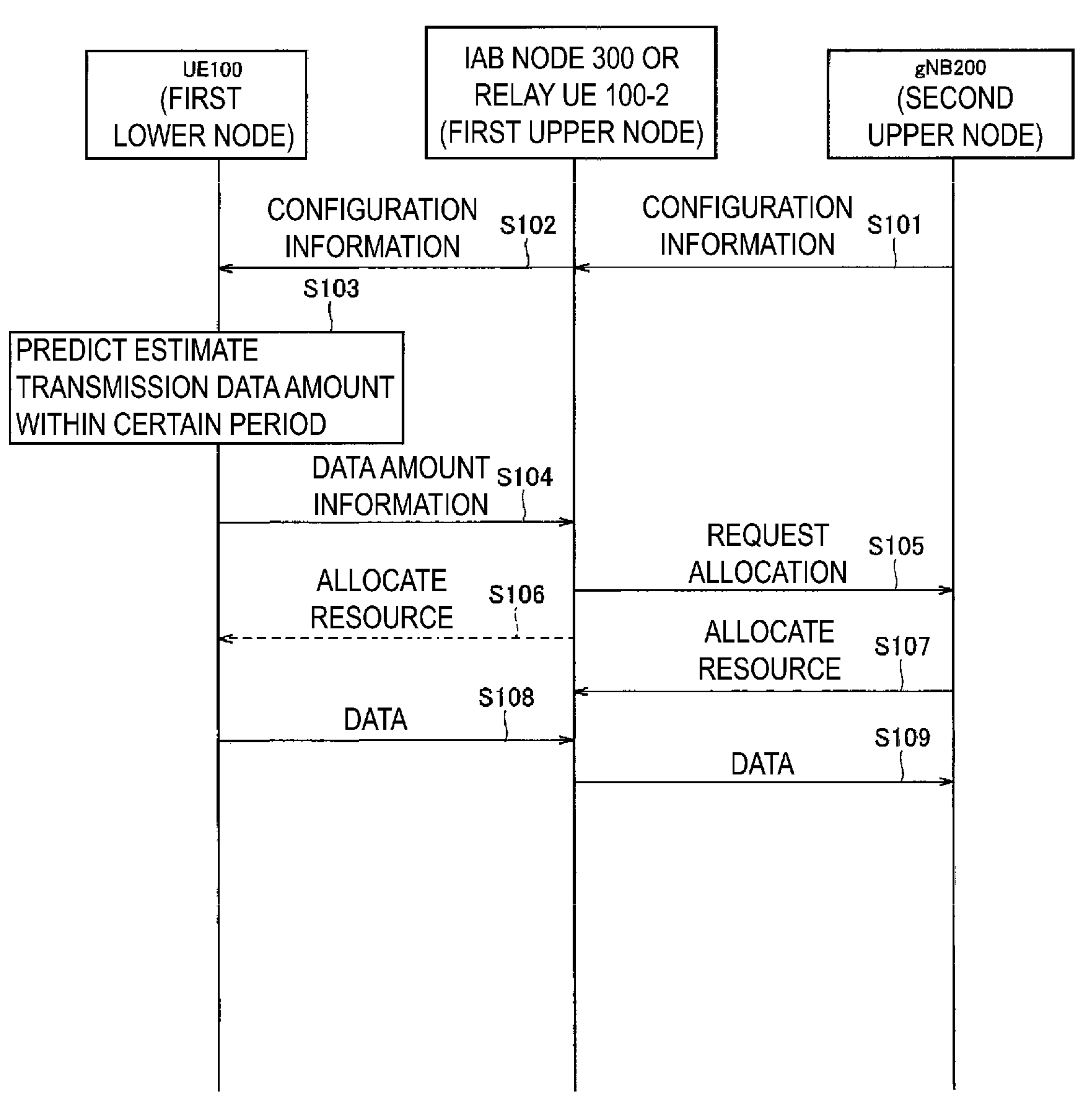
FIG. 10 is a diagram illustrating a first specific example of the relay control method according to the first embodiment.

FIG. 10 is a diagram illustrating a first specific example of the relay control method according to the first embodiment. The present example is an operation example assuming a case in which the UE 100 (first lower node) communicates with the gNB 200 (second upper node) via the first upper node.

As illustrated in FIG. 10, in Step S101, the gNB 200 being the second upper node transmits configuration information for configuring the certain period for the UE 100 being the first lower node to the first upper node (the IAB node 300 or the relay UE 100-2). The configuration information may be included in an RRC message or an F1 message (F1-AP message) transmitted from the gNB 200 to the UE 100 via the first upper node.

Here, the certain period may be expressed by an integer multiple of a predetermined time unit. For example, the configuration information includes information indicating the number of subframes or the number of radio frames (SFN value) corresponding to the certain period. For example, when the information indicating the number of subframes is 4-bit information, specification is carried out in the following manner: "000" indicates 4 subframes, "001" indicates 8 subframes, "010" indicates 16 subframes, and "011" indicates 32 subframes.

Alternatively, on the presupposition that cyclic uplink radio resources (cyclic uplink transmission occasions) are allocated to the UE 100, the certain period may be expressed by an integer multiple of the allocation cycle (which may be referred to as a "Configured Grant cycle"). For example, when the Configured Grant cycle is N times, the configuration information includes information indicating the value of N.

When the UE 100 is the remote UE 100-1 and the first upper node is the relay UE 100-2, the certain period may be a period for the next resource pool (next transmission occasion). The resource pool is a time and frequency resource group that can be used by the remote UE 100-1 for data transmission. The certain period may be a period of N resource pools in future (N transmission occasions in future). In this case, the configuration information includes information indicating the value of N.

The operation example describes an example in which the first upper node transmits by relaying the configuration information transmitted by the gNB 200 to the UE 100. However, the first upper node may actively transmit the configuration information to the UE 100.

In Step S102, the first upper node transmits the configuration information received from the gNB 200 in Step S101 to the UE 100.

In Step S103, the UE 100 predicts the estimate transmission data amount in a certain period in future, based on the configuration information received from the first upper node. The UE 100 may predict the estimate transmission data amount, based on at least one of the application information obtained from the application layer of the UE 100 and the statistical information obtained from the most recent communication state.

In Step S104, the UE 100 transmits data amount information indicating the estimate transmission data amount in the certain period in future predicted in Step S103 to the first upper node. The UE 100 may transmit a MAC control element including the data amount information to the first upper node, or may transmit an RRC message including the data amount information to the first upper node. The UE 100 may further include time information indicating the certain period configured from the gNB 200 in these messages. Alternatively, the UE 100 may transmit the time information to the first upper node prior to transmission of these messages. The UE 100 may transmit the RRC message including the data amount information to the gNB 200 via the first upper node.

In Steps S103 and S104, the UE 100 may predict the estimate transmission data amount for each logical channel group (LCG), and perform notification of the data amount information for in a unit of LCG. The unit of predicting and performing notification of the estimate transmission data amount is not limited to the unit of LCG, and may be a unit of logical channel or may be a unit of a bearer.

In Step S105, the first upper node requests the gNB 200 to allocate uplink radio resources, based on the data amount information received from the UE 100 in Step S104. For example, the first upper node may transmit a scheduling request (SR) for requesting allocation of PUSCH resources to the gNB 200 on a physical uplink control channel (PUCCH), or may transmit a BSR based on the data amount information received from the UE 100 to the gNB 200 on a PUSCH.

In Step S106, the first upper node allocates radio resources to the UE 100, based on the data amount information received from the UE 100. Note that, when the UE 100 is the remote UE 100-1 and the first upper node is the relay UE 100-2, the resource pool may be configured in advance for the remote UE 100-1. For example, when the remote UE 100-1 is present within the coverage of the gNB 200, the resource pool may be configured from the gNB 200 to the remote UE 100-1. When the remote UE 100-1 is present outside of the coverage of the gNB 200, the remote UE 100-1 may use the resource pool configured for the remote UE 100-1 in advance.

In Step S107, the gNB 200 allocates uplink radio resources to the first upper node, based on the allocation request received from the first upper node in Step S107.

In Step S108, the UE 100 transmits data to the first upper node on a PUSCH or a physical sidelink shared channel (PSSCH) by using the radio resources allocated from the upper node in Step S106 and the resource pool configured in advance.

In Step S109, the first upper node transmits the data received from the UE 100 in Step S108 to the gNB 200 on a PUSCH by using the uplink radio resources allocated from the gNB 200 in Step S107.

Figure 11:
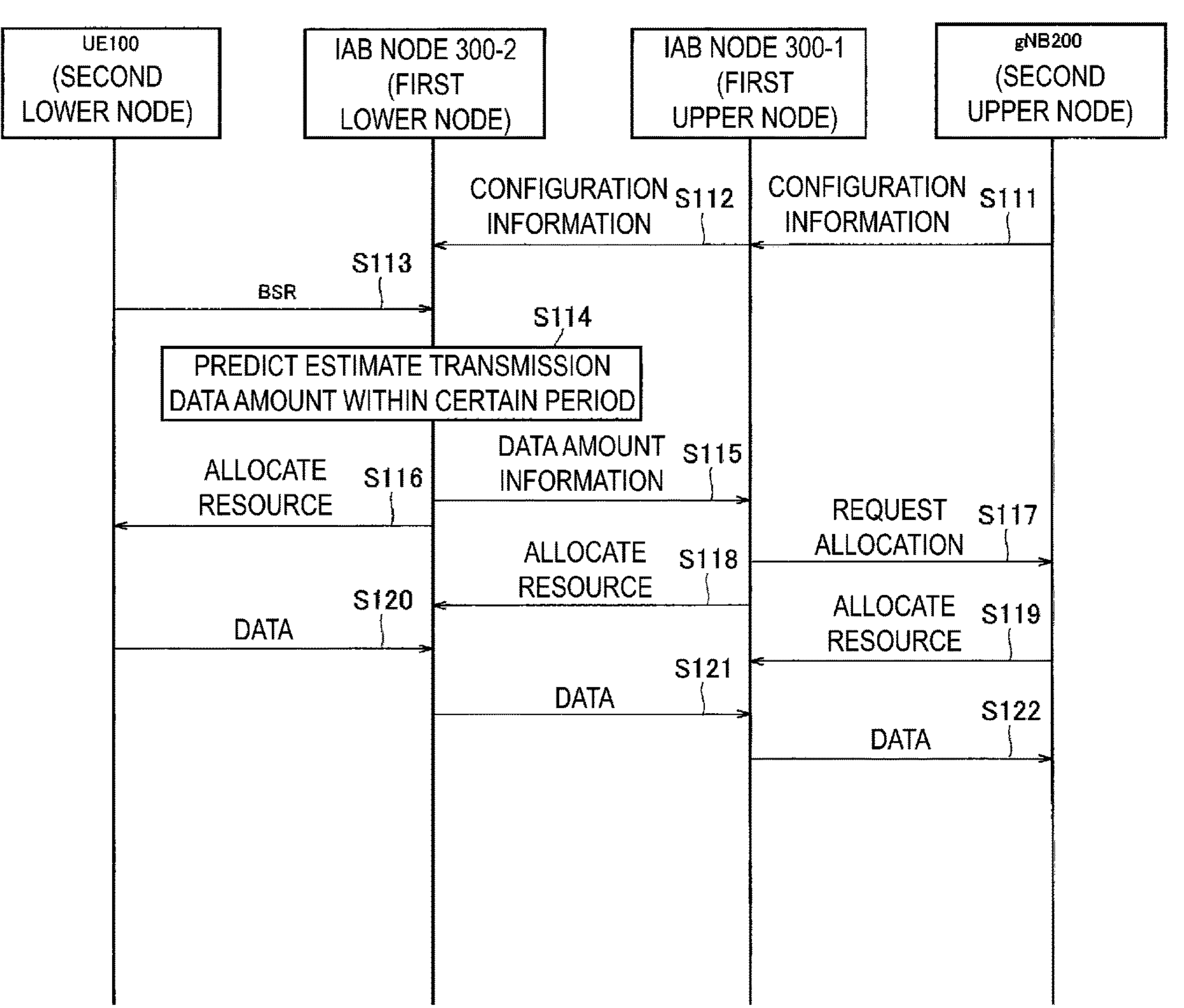
FIG. 11 is a diagram illustrating a second specific example of the relay control method according to the first embodiment.

FIG. 11 is a diagram illustrating a second specific example of the relay control method according to the first embodiment. The present example is an operation example assuming a case in which the UE 100 (second lower node) communicates with the gNB 200 (second upper node) via the IAB node 300-2 (first lower node) and the IAB node 300-1 (first upper node) (see FIG. 1).

As illustrated in FIG. 11, Steps S111 and S112 are the same as those of operation example 1 described above.

In Step S113, the UE 100 transmits the BSR to the IAB node 300-2.

In Step S114, the IAB node 300-2 predicts the estimate transmission data amount in the certain period in future, based on the configuration information. The IAB node 300-2 may predict the estimate transmission data amount in the certain period in future, based on the BSR received from the UE 100 in Step S113.

In Step S115, the IAB node 300-2 transmits the data amount information indicating the estimate transmission data amount in the certain period in future predicted in Step S114 to the IAB node 300-1. The IAB node 300-2 may transmit a MAC control element including the data amount information to the IAB node 300-1, or may transmit an RRC message including the data amount information to the IAB node 300-1. The IAB node 300-2 may further include time information indicating the configured certain period in these messages. Alternatively, the IAB node 300-2 may transmit the time information to the IAB node 300-1 prior to transmission of these messages. The IAB node 300-2 may transmit an RRC message or an F1-AP message including the data amount information to the gNB 200 via the IAB node 300-1.

In Steps S114 and S115, the IAB node 300-2 may predict the estimate transmission data amount for each LCG, and perform notification of the data amount information for in a unit of LCG. The unit of predicting and performing notification of the estimate transmission data amount is not limited to the unit of LCG, and may be a unit of logical channel or may be a unit of a bearer.

In Step S116, the IAB node 300-2 allocates uplink radio resources to the UE 100, based on the BSR received from the UE 100 in Step S113.

In Step S117, the IAB node 300-1 requests the gNB 200 to allocate uplink radio resources, based on the data amount information received from the IAB node 300-2 in Step S115. For example, the IAB node 300-1 may transmit an SR for requesting allocation of PUSCH resources to the gNB 200 on a PUCCH, or may transmit a BSR based on the data amount information received from the IAB node 300-2 in Step S115 to the gNB 200 on a PUSCH.

In Step S118, the IAB node 300-1 allocates uplink radio resources to the IAB node 300-2, based on the data amount information received from the IAB node 300-2 in Step S115.

In Step S119, the gNB 200 allocates uplink radio resources to the IAB node 300-1, based on the allocation request received from the IAB node 300-1 in Step S117.

In Step S120, the UE 100 transmits data to the IAB node 300-2 on a PUSCH by using the uplink radio resources allocated from the IAB node 300-2 in Step S116.

In Step S121, the IAB node 300-2 transmits data from the UE 100 to the IAB node 300-1 on a PUSCH by using the uplink radio resources allocated from the IAB node 300-1 in Step S118.

In Step S122, the IAB node 300-1 transmits data from the IAB node 300-2 to the gNB 200 on a PUSCH by using the uplink radio resources allocated from the gNB 200 in Step S119.

Second Embodiment

Next, a second embodiment will be described, mainly regarding differences from the first embodiment.

Figure 12:
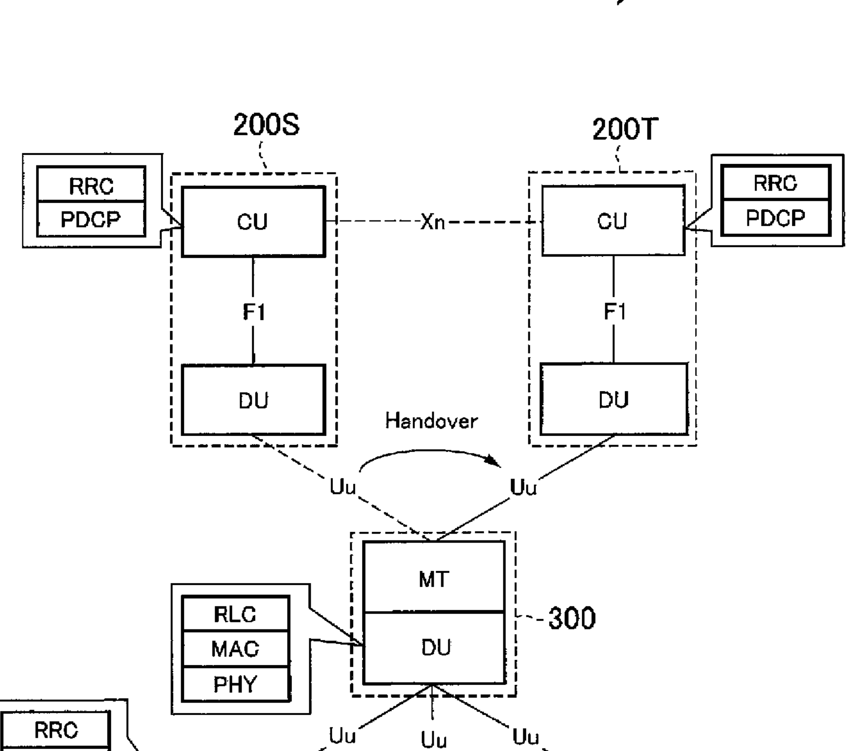
FIG. 12 is a diagram illustrating a configuration example of a mobile communication system according to a second embodiment.

FIG. 12 is a diagram illustrating a configuration example of a mobile communication system 1 according to the second embodiment. As illustrated in FIG. 12, in the second embodiment, it is assumed that an IAB node 300 being an example of a relay node performs handover. Note that the relay node may be the relay UE 100-2 described above. As illustrated in FIG. 12, the IAB node 300 performs handover from a gNB 200S to a gNB 200T.

Each gNB 200 includes a CU and a DU. The CU and the DU are connected to each other via an F1 interface. The CU includes upper layers (an RRC layer and a PDCP layer). The DU includes lower layers (an RLC layer, a MAC layer, and a PHY layer). Between the CU of the gNB 200S and the CU of the gNB 200T, an Xn interface being an inter-base station interface is present. An NG interface may be present between the CU of the gNB 200S and a 5G core network (5GC) 10, and indirect connection via the 5GC 10 may be established between the CU of the gNB 200S and the CU of the gNB 200T. In the description below, a scenario in which handover of the IAB node 300 is performed from the gNB 200S to the gNB 200T is referred to as "inter-CU handover of the IAB node 300".

FIG. 12 illustrates an example of a scenario in which the inter-CU handover of the IAB node 300 is performed from the gNB 200S to the gNB 200T. However, the inter-CU handover of the IAB node 300 may be performed from an apparatus under control of the gNB 200S (a lower IAB node of the gNB 200S) to an apparatus under control of the gNB 200T (a lower IAB node of the gNB 200T). For example, before the inter-CU handover of the IAB node 300, one or a plurality of IAB nodes may be present on a path between the IAB node 300 and the gNB 200S. After the inter-CU handover of the IAB node 300, one or a plurality of IAB nodes may be present on a path between the IAB node 300 and the gNB 200T.

In FIG. 12, as the lower node under control of the IAB node 300, a plurality of UEs 100 (UEs 100*a* to 100*c*) are illustrated as an example. The lower IAB node may be present under control of the IAB node 300. In other words, the lower node under control of the IAB node 300 is at least one of the UE 100 and the lower IAB node. In the description below, an example in which the lower node under control of the IAB node 300 is the UE 100 will be mainly described. The UE 100 is connected to the DU of the IAB node 300 via a Uu interface.

The IAB node 300 includes an MT and a DU. The MT of the IAB node 300 is connected to the DU of the gNB 200 via the Uu interface. The Uu interface between the MT of the IAB node 300 and the DU of the gNB 200 is used as a backhaul link. The IAB node 300 includes a BAP layer. The BAP layer may be located in an intermediate layer between the MT and the DU, or at least a part of the BAP layer may be incorporated into the MT and/or the DU.

Each of the UE 100 and the MT includes upper and lower layers (an RRC layer, a PDCP layer, an RLC layer, a MAC layer, and a PHY layer). The lower layers (the RLC layer, the MAC layer, and the PHY layer) of each UE 100 perform communication with the DU (the RLC layer, the MAC layer, and the PHY layer) of the IAB node 300. In contrast, the upper layers (the RRC layer and the PDCP layer) of each UE 100 perform communication with the CU (the RRC layer and the PDCP layer) of the gNB 200.

In the example illustrated in FIG. 12, before handover, the IAB node 300 relays data received from each UE 100 to the gNB 200S. Here, the data received from each UE 100 is encrypted in the PDCP layer of the UE 100. The PDCP layer of the gNB 200S decodes (decrypts) the data relayed by the IAB node 300, using key information shared with the UE 100.

Here, when the IAB node 300 performs the inter-CU handover, if the IAB node 300 relays stored (buffered) data that is received from the UE 100 to the gNB 200T, the PDCP layer of the gNB 200T does not have key information and cannot thus decode the data. Thus, the data is discarded in the gNB 200T. As a result, even if buffered data is relayed to the gNB 200T, such relay is wasteful, which leads to wasteful use of resources. In the second embodiment, by preventing such a wasteful relay, the wasteful use of resources can be prevented.

Figure 13:
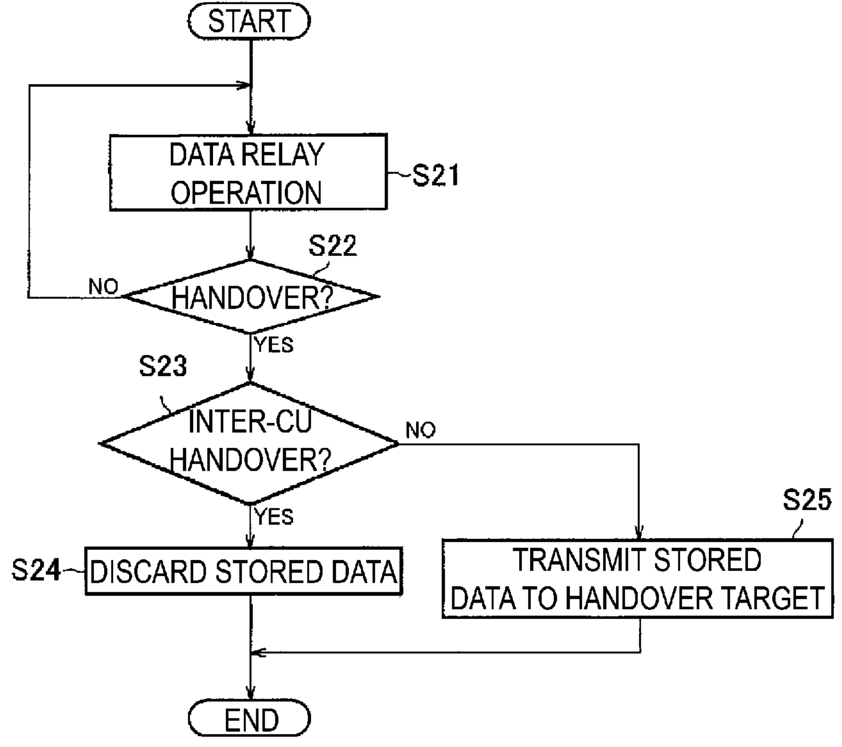
FIG. 13 is a diagram illustrating a relay control method according to the second embodiment.

FIG. 13 is a diagram illustrating a relay control method according to the second embodiment. The relay control method according to the second embodiment is a method used in the mobile communication system 1 in which one or a plurality of relay nodes relay data from the UE 100 to the gNB 200.

As illustrated in FIG. 13, in Step S21, a first relay node included in one or a plurality of relay nodes performs data relay operation. The first relay node is not limited to the IAB node 300, and may be the relay UE 100-2.

Specifically, the first relay node receives data from a lower node being a lower node of the first relay node. The lower node may be the UE 100, or may be the lower IAB node 300. The first relay node stores (buffers) the data received from the lower node until transmission of the data to an upper node being an upper node of the first relay node completes. The upper node may be the gNB 200, or may be the upper IAB node 300.

In Step S22, the first relay node determines whether to perform handover. For example, when the first relay node receives a handover indication from the upper node, the first relay node determines to perform handover. When the first relay node does not perform handover (Step S22: NO), the first relay node continues the data relay operation (Step S21).

In contrast, when the first relay node performs handover (Step S22: YES), in Step S23, the first relay node determines whether the handover is the inter-CU handover. The inter-CU handover is handover to the gNB 200T (second base station) different from the gNB 200S (first base station) or to the second relay node under control of the gNB 200T, which is performed by the first relay node.

For example, the gNB 200T or the second relay node may transmit (for example, broadcast as a part of system information) an identifier related to the gNB 200T. The first relay node may detect the inter-CU handover (handover between the gNBs 200 different from each other), based on the identifier received from the gNB 200T or the second relay node. Specifically, the first relay node detects the inter-CU handover, depending on whether the identifier related to the gNB 200S recognized before the handover and an identifier received from a handover target candidate match.

Alternatively, the gNB 200S may transmit a handover indication including information related to the inter-CU handover to the first relay node. The information related to the inter-CU handover may be an identifier related to the gNB 200 as a handover target. The first relay node may detect the inter-CU handover, based on the information included in the handover indication.

Alternatively, the first relay node may detect the inter-CU handover, based on a state of the PDCP layer of the first relay node before and after the handover. For example, the first relay node detects the inter-CU handover, in response to occurrence of reestablishment of the PDCP layer.

When the handover is the inter-CU handover (Step S23: YES), in Step S24, the first relay node discards the data stored in Step S21 (i.e., the buffered uplink data), in response to execution of the handover. In this case, the first relay node does not relay the buffered uplink data to the handover target.

When the handover is not the inter-CU handover (Step S23: NO), in Step S25, the first relay node transmits (relays) the buffered uplink data to the handover target, in response to execution of the handover. Note that, a case in which the handover is not the inter-CU handover refers to a case in which the first relay node executes the handover to the gNB 200S or to the relay node under control of the gNB 200S.

Other Embodiments

The embodiments described above mainly describe an example in which the mobile communication system 1 is a 5G mobile communication system. However, the base station in the mobile communication system 1 may be an eNB being an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program that causes a computer to execute each of the processing operations according to the embodiments described above may be provided. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

The invention claimed is:

1. A control method comprising: receiving, by an Integrated Access and Backhaul (IAB) node included in a plurality of IAB nodes relaying data from user equipment to a base station, from the base station via an Radio Resource Control (RRC) message, configuration information for configuring use of data amount information indicating data amount estimated to transmit from the IAB node, the IAB nodes including both user equipment function and base station function, and the IAB node being located on a relay path such that the IAB node communicates with the user equipment via a lower IAB node in the plurality of IAB nodes and communicates with the base station via an upper IAB node in the plurality of IAB nodes; receiving, by the base station function of the IAB node, from a user equipment function of the lower IAB node, a buffer state report; transmitting, by the user equipment function of the IAB node, to a base station function of the upper IAB node, the data amount information based on the buffer state report received from the lower IAB node in response to receiving the configuration information from the base station and receiving the buffer state report from the lower IAB node; and allocating, by the IAB node to the lower IAB node an uplink radio resource after transmitting the data amount information to the upper IAB node.

2. An Integrated Access and Backhaul (IAB) node included in a plurality of IAB nodes relaying data from user equipment to a base station, the IAB nodes including both user equipment function and base station function, and the IAB node being located on a relay path such that the IAB node communicates with the user equipment via a lower IAB node in the plurality of IAB nodes and communicates with the base station via an upper IAB node in the plurality of IAB nodes, the IAB node comprising: a receiver configured to: receive from the base station via an Radio Resource Control (RRC) message, configuration information configuring use of data amount information indicating data amount estimated to transmit from the IAB node, and receive by the base station function of the IAB node from a user equipment function of the lower IAB node, a buffer state report, a transmitter configured to transmit by the user equipment function of the IAB node, to a base station function of the upper IAB node, the data amount information based on the buffer state report received from the lower IAB node in response to receiving the configuration information from the base station and receiving the buffer state report from the lower IAB node, and a controller configured to allocate to the lower IAB node an uplink radio resource after transmitting the data amount information to the upper IAB node.

3. A chipset for controlling an Integrated Access and Backhaul (IAB) node included in a plurality of IAB nodes relaying data from user equipment to a base station, the IAB nodes including both user equipment function and base station function, and the IAB node being located on a relay path such that the IAB node communicates with the user equipment via a lower IAB node in the plurality of IAB nodes and communicates with the base station via an upper IAB node in the plurality of IAB nodes, the chipset comprising: a processor and a memory coupled to the processor, the processor configured to: receive from the base station via an Radio Resource Control (RRC) message, configuration information for configuring use of data amount information indicating data amount estimated to transmit from the IAB node, receive by the base station function of the IAB node from a user equipment function of the lower IAB node, a buffer state report, transmit by the user equipment function of the IAB node, to a base station function of the upper IAB node, the data amount information based on the buffer state report received from the lower IAB node in response to receiving the configuration information from the base station and receiving the buffer state report from the lower IAB node, and allocate an uplink radio resource after transmitting the data amount information to the upper IAB node after transmitting the data amount information to the upper IAB node.

* * * * *